United States Patent Office 3,577,529
Patented May 4, 1971

3,577,529
COMPOSITIONS AND METHODS FOR ENHANCEMENT OF THE GROWTH RATE OF POULTRY AND ANIMALS EMPLOYING ALKALI METAL FORMALDEHYDE SULFOXYLATES AND BISULFITES
Joseph Michael Pensack, Hopewell Township, Trenton, N.J., assignor to American Cyanamid Company, Stamford, Conn.
No Drawing. Filed Apr. 17, 1968, Ser. No. 721,921
Int. Cl. A61k 21/00
U.S. Cl. 424—114          11 Claims

ABSTRACT OF THE DISCLOSURE

A growth rate accelerator for poultry and farm animals having as one active component, an alkali metal formaldehyde bisulfite or an alkali metal formaldehyde sulfoxylate. The compositions can, in addition, contain other materials which enhance the growth rate of the host, such as tetracycline antibiotics, penicillins, zinc bacitracin, erythromycin and/or bis(5-nitrofurfurylidene)-acetoneguanylhydrazone. Growth rate accelerating compositions comprising the above-mentioned growth rate accelerators and ingestible diluents are also provided.

---

This invention relates to the provision of novel compositions for accelerating the growth rate of poultry and farm animals. It relates further to a method of accelerating the growth rate of poultry and farm animals comprising orally administering to the host an effective amount of a growth accelerating compound selected from the group consisting of alkali metal formaldehyde sulfoxylates and alkali metal formaldehyde bisulfites.

Heretofore, certain compositions such as the tetracycline antibiotics, chlortetracycline, oxytetracycline and tetracycline, penicillin, zinc bacitracin, erythromycin and bis-(5 - nitrofurfurylidene) - acetoneguanylhydrazone and its acid addition salts have been employed as growth accelerating compositions for poultry and/or young domestic animals. Such compositions are effective for this purpose, however with increasing demands for greater food production, it is important that still greater growth acceleration be achieved. It is, therefore, an object of the present invention to provide novel compositions for enhancing the growth rate of poultry and farm animals. It is also an object of the invention to provide a means of improving feed conversion (i.e., the ratio of unit weight of feed/unit weight of gain) in the raising of poultry and farm animals.

In accordance with the invention, the growth rate of poultry such as chickens, turkeys, ducks, geese and the like, and animals such as swine, cattle and sheep, is significantly improved by administering to the host an effective amount of a compound selected from the group consisting of alkali metal formaldehyde sulfoxylates and alkali metal formaldehyde bisulfites and mixtures thereof. In practice, such compositions are generally administered in, or with, the feed in an amount equivalent to about 0.05% to about 8.0%, and preferably, about 0.25% to 2.0%, by weight of the feed. However, they may also be administered in other forms such as capsules, powders, pellets, pills and boluses, or as liquid compositions such as emulsions, suspensions and solutions. Moreover, it has been found that these compounds are very water soluble and well adapted to administration in the drinking water of animals and poultry. When administered in any of the above modes, an amount of compound is employed which is approximately equivalent to that which would be consumed by the host when the compound is administered in or with daily feed.

Although it is obvious that feed consumption will vary grossly with the type and size of a particular animal, nevertheless, the amount of compound to be administered to a given animal on a per head per day basis is readily ascertainable from the above values, and the normal feed consumption rate of such an animal. Average feed consumption rates for poultry and animals at different stages of growth are, of course, readily available and well known to agriculturalists, breeders, farmers and research personnel involved with the poultry and livestock industries.

Advantageously, it has also been discovered that the growth rate accelerators of the invention are highly effective when used in combination with one or more of a variety of other growth enhancing or disease-controlling substances such as the tetracyclines, zinc bacitracin, tylosin tartrate, erythromycin, penicillin and the pharmaceutically acceptable salts thereof, as well as with mixtures of either chlortetracycline, sulfamethazine and bis(5-nitrofurfurylidene)-acetoneguanylhydrazone or chlortetracycline, penicillin and bis(5-nitrofurfurylidene)-acetoneguanylhydrazone. It is most significant that the growth accelerating effect obtained with the accelerators of this invention is independent of, and enhanced to an unexpected degree when they are used in combination with known accelerators such as hereinabove mentioned.

Combinations which have been found to be particularly efficacious as growth promoters include (1) sodium formaldehyde bisulfite plus bis(5-nitrofurfurylidene)acetoneguanylhydrazine, (2) sodium formaldehyde bisulfite plus chlortetracycline (3) sodium formaldehyde bisulfite plus bis(5-nitrofurfurylidene)acetoneguanylhydrazone and chlortetracycline, (4) sodium formaldehyde bisulfite plus sulfamethazine, bis(5 - nitrofurfurylidene)acetoneguanylhydrazone and chlortetracycline and (5) sodium formaldehyde bisulfite plus sulfamethazine, chlortetracycline and penicillin.

When these combination accelerators are to be used in the manufacture of finished feeds, they are generally prepared as premixes or concentrates and blended with the feed shortly before use. This practice facilitates handling and shipping, reduces or eliminates stability problems and usually assures that optimal levels of the medicaments are administered to the animals.

Typical premixes for the above combinations are as follows:

| Ingredients | A | B | C |
|---|---|---|---|
| (1): | | | |
| Bis(5-nitrofurfurylidene)-acetoneguanylhydrazone, gms | 10 | 10 | 20 |
| Sodium formaldehyde bisulfite, lbs | 5 | 10 | 20 |
| Diluent—Solvent extracted soybean feed and soybean meal | (¹) | (²) | (³) |
| (2): | | | |
| Sodium formaldehyde bisulfite, lbs | 5 | 10 | 20 |
| Chlortetracycline, gms | 200 | 200 | 200 |
| Diluent—Dried extracted chlortetracycline meal and fermentation solubles, solvent extracted soybean feed and soybean meal | (¹) | (²) | (³) |
| (3): | | | |
| Bis(5-nitrofurfurylidene)-acetoneguanylhydrazone, gms | 10 | 10 | 20 |
| Chlortetracycline, gms | 200 | 200 | 200 |
| Sodium formaldehyde bisulfite, lbs | 5 | 10 | 20 |
| Diluent—Dried extracted chlortetracycline meal and fermentation solubles, solvent extracted soybean feed and soybean meal | (¹) | (²) | (³) |
| (4): | | | |
| Bis(5-nitrofurfurylidene)-acetoneguanylhydrazone, gms | 10 | 10 | 20 |
| Chlortetracycline, gms | 100 | 100 | 100 |
| Sulfamethazine, gms | 100 | 100 | 100 |
| Sodium formaldehyde bisulfite, lbs | 5 | 10 | 20 |
| Diluent—Dried extracted chlortetracycline meal and fermentation solubles, solvent extracted soybean feed and soybean meal | (¹) | (²) | (³) |

See footnotes at end of table.

TABLE—Continued

| Ingredients | A | B | C |
|---|---|---|---|
| (5): | | | |
| Penicillin, gms | 50 | 50 | 50 |
| Chlortetracycline, gms | 100 | 300 | 100 |
| Sulfamethazine, gms | 100 | 100 | 100 |
| Sodium formaldehyde bisulfite, lbs | 5 | 10 | 20 |
| Diluent—Dried extracted chlortetracycline meal and fermentation solubles, solvent extracted soybean feed and soybean meal | (1) | (2) | (3) |

[1] Q.s. to 6 or 10 lbs.
[2] Q.s. to 20 lbs.
[3] Q.s. to 25 or 50 lbs.

Premix A is designed to be mixed at the rate of 6 or 10 lbs. per ton of feed. Premix B is designed to be mixed at the rate of 20 lbs./ton of feed and Premix C is designed to be mixed at the rate of 25 or 50 lbs./ton of feed. As shown above, such premixes or concentrates generally contain from about 40 to 85% by weight of the growth accelerating alkali metal sulfoxylate or bisulfite, from about 15 to 60% by weight of ingestible diluent and from 0 to about 8.0% by weight of another growth accelerating or disease controlling substance.

The following examples and tests demonstrate the growth promoting effect and improved feed efficiency obtained by the administration of an alkali metal formaldehyde bisulfite or sulfoxylate alone and in combination with other drugs in the feed material.

The basal diet employed in all poultry tests has the following composition:

Poultry basal diet

| Ingredient: | Gms./kg. |
|---|---|
| Ground yellow corn | 514 |
| Soybean oil meal (44%) | 300 |
| Corn gluten meal | 50 |
| Menhaden fish meal (60%) | 50 |
| Fat | 40 |
| Dehydrated alfalfa meal (17%) | 20 |
| Ground limestone | 5 |
| Dicalcium phosphate | 12 |
| Sodium chloride | 3 |
| Trace minerals [1] | 1 |
| Vitamin pre-mix [2] | 5 |

[1] Trace minerals are manganese (6.0%), iodine (.12%), iron (2.0%), copper (.2%), zinc (2.0%), cobalt (.02%), and calcium (25.5%).
[2] Vitamin premix, per kg. of feed, contains 125 mg. butylated hydroxy toluene, 500 mg. DL-methionine, 3300 I.U. Vitamin A, 1100 I.U. Vitamin $D_3$, 2.2 I.U. Vitamin E, 11 mcg. Vitamin $B_{12}$, 4.4 mg. riboflavin, 27.5 mg. niacin, 8.8 mg. pantothenic acid, 500 mg. choline chloride, 1.43 mg. folic acid, and 1.1 mg. menadione sodium bisulfite to 5 g. of ground yellow corn.

EXAMPLE 1

Day-old chicks (6 males and 6 females per group) purchased from a commercial supplier are housed in heated brooders and held in a chick room maintained at about (24° C.) for four weeks. All chick groups are weighed at the start of the tests and on termination at four weeks. Feed and water are supplied ad libitum. The basal diet described above is used for all tests with and without sodium formaldehyde bisulfite added. Treatments used are: no additive (control), 0.5% sodium formaldehyde bisulfite (NaFB), and 1.0% sodium formaldehyde bisulfite by weight of feed, 10 p.p.m. of Payzone® nitrovin ({{3 - (5 - nitro - 2 - furyl) - 1 - [2 - (5 - nitro - 2 - furyl) vinyl]allylidene}amino} - guanidine hydrochloride or bis (5 - nitrofurfurylidene) - acetoneguanylhydrazone), 200 p.p.m. chlortetracycline (CTC) and the combination thereof. Two groups of chicks per treatment are used and the tests are replicated nine times. The data obtained for 18 replicates is averaged and reported below. These data demonstrate the dramatic growth promoting effect obtained in poultry receiving 0.5 or 1.0% of sodium formaldehyde bisulfite by weight of feed. They also show the improved growth rate obtained with combinations of sodium formaldehyde bisulfite and the named drugs.

Average four week weights—18 replicates—
(grams/bird)

| | |
|---|---|
| Control no additive | 549 |
| NaFB (0.5%) | 562 |
| NaFB (1.0%) | 587 |

Average four week feed conversion
(grams feed/gram gain)

| | |
|---|---|
| Control no additive | 1.70 |
| NaFB (0.5%) | 1.68 |
| NaFB (1.0%) | 1.67 |

AVERAGE FOUR WEEK WEIGHTS (GRAMS/BIRD)

| | None | Nitrovin, 10 p.p.m. | CTC-HCl, 200 p.p.m. | Nitrovin, 10 p.p.m. plus 200 CTC HCl |
|---|---|---|---|---|
| None | 549 | 565 | 579 | 605 |
| 0.5% NaFB | 562 | 592 | 598 | 619 |
| 1.0% NaFB | 587 | 601 | 601 | 614 |

AVERAGE FOUR WEEK FEED CONVERSION (GRAM FEED/GRAM GAIN)

| | None | Nitrovin, 10 p.p.m. | CTC-HCl, 200 p.p.m. | Nitrovin, 10 p.p.m. plus 200 CTC HCl |
|---|---|---|---|---|
| None | 1.70 | 1.65 | 1.68 | 1.62 |
| 0.5% NaFB | 1.68 | 1.63 | 1.64 | 1.63 |
| 1.0% NaFB | 1.67 | 1.64 | 1.66 | 1.60 |

EXAMPLE 2

Day-old broiler chicks (6 males and 6 females per group) obtained from a commercial chickery are housed in electrically heated brooders and held in a chick room maintained at about (24° C.) for four weeks. All chick groups are weighed at the start of the tests and periodically thereafter until termination at four weeks. Feed and water are supplied ad libitum.

The basal diet described above is used for all tests with and without medicament added. Treatments used are no medicament (control), 10 p.p.m. of Payzone® nitrovin, 200 p.p.m. chlortetracycline hydrochloride, 50 p.p.m. zinc bacitracin, 0.5% sodium formaldehyde bisulfite, 1.0% sodium formaldehyde bisulfite, and combinations of these additives. Two groups of chicks per treatment are tested, the tests are twice replicated, and averaged. These data clearly demonstrate that sodium formaldehyde bisulfite is a growth promoter for chickens when orally administered alone and in combination with other drugs at the rate of 0.5 and 1.0% in the diet.

FOUR WEEK SEXED WEIGHTS (GRAMS/BIRD)

| | None | Zinc bacitracin, 50 p.p.m. | CTC. HCl,[1] 200 p.p.m. | Nitrovin, 10 p.p.m. | Zn bac. plus nitrovin | CTC plus nitrovin |
|---|---|---|---|---|---|---|
| None | 538 | 552 | 586 | 558 | 602 | 599 |
| 0.5% NaFB | 549 | 578 | 594 | 579 | 612 | 610 |
| 1.0% NaFB | 583 | 609 | 587 | 595 | 605 | 614 |

FOUR WEEK FEED CONVERSION (GRAMS FEED/GRAM GAIN)

| | None | Zinc bacitracin, 50 p.p.m. | CTC. HCl,[1] 200 p.p.m. | Nitrovin, 10 p.p.m. | Zn bac. plus nitrovin | CTC plus nitrovin |
|---|---|---|---|---|---|---|
| None | 1.76 | 1.69 | 1.72 | 1.71 | 1.66 | 1.67 |
| 0.5% NaFB | 1.75 | 1.72 | 1.65 | 1.68 | 1.71 | 1.67 |
| 1.0% NaFB | 1.71 | 1.66 | 1.72 | 1.66 | 1.65 | 1.63 |

[1] CTC.HCl—Chlortetracycline hydrochloride.

EXAMPLE 3

Following the procedure of Example 2 above, the growth promoting effect of sodium formaldehyde bisulfite alone and in combination with tylosin tartrate, chlortetracycline hydrochloride (CTC.HCl) and tylosin tartrate plus chlortetracycline hydrochloride, is determined. Treatments are: No additive (control), 0.5 or 1.0% sodium formaldehyde bisulfite, 50 p.p.m. tylosin tartrate, 200 p.p.m. chlortetracycline. Combination of the latter drugs are at the stated levels. The data provided below illustrate the substantial increase in growth rate obtained with sodium formaldehyde bisulfite alone and in combination with the drugs mentioned.

FOUR WEEKS SEXED WEIGHTS (GRAMS/BIRD)

|  | None | Tylosin tartrate, 50 p.p.m. | CTC.HCL, 200 p.p.m. | Tylosin plus CTC.HCl |
|---|---|---|---|---|
| None | 497 | 552 | 543 | 574 |
| 0.5% NaFB | 542 | 564 | 578 | 600 |
| 1.0% NaFB | 536 | 578 | 585 | 622 |

FOUR WEEK FEED CONVERSION (GRAMS FEED/GRAM GAIN)

|  | None | Tylosin tartrate, 50 p.p.m. | CTC.HCL, 200 p.p.m. | Tylosin plus CTC.HCl |
|---|---|---|---|---|
| None | 1.80 | 1.70 | 1.72 | 1.68 |
| 0.5% NaFB | 1.68 | 1.63 | 1.67 | 1.67 |
| 1.0% NaFB | 1.70 | 1.61 | 1.67 | 1.64 |

EXAMPLE 4

Following the procedure of Example 2, sodium formaldehyde bisulfite is administered orally alone, and in combination, with 5 p.p.m. of procaine penicillin, Payzone® nitrovin (10 p.p.m.), chlortetracycline (200 p.p.m.) and combinations thereof, chlortetracycline hydrochloride (200 p.p.m.) plus 1.25% of sodium sulfate, Payzone® nitrovin (10 p.p.m.) and combinations thereof. The data are presented in the following tables.

AVERAGE FOUR WEEK WEIGHTS (GRAMS/BIRD)

|  | None | Procaine plus pen., 50 p.p.m. | Nitrovin, 10 p.p.m. | Nitrovin plus penicillin |
|---|---|---|---|---|
| None | 523 | 580 | 551 | 618 |
| 0.5% NaFB | 562 | 600 | 589 | 599 |
| 1.0% NaFB | 582 | 617 | 581 | 616 |

|  | CTC, 200 p.p.m. | Nitrovin plus CTC | CTC plus penicillin | CTC plus pen. plus nitrovin |
|---|---|---|---|---|
| None | 574 | 599 | 590 | 564 |
| 0.5% NaFB | 605 | 607 | 595 | 596 |
| 1.0% NaFB | 604 | 647 | 623 | 653 |

AVERAGE FOUR WEEK WEIGHTS (GRAMS/BIRD)

|  | None | Na₂SO₄ 1.25% | CTC.HCl, 200 p.p.m. | CTC plus Na₂SO₄ |
|---|---|---|---|---|
| None | 555 | 536 | 601 | 593 |
| 0.5% NaFB | 560 | 589 | 605 | 614 |
| 1.0% NaFB | 620 | 609 | 628 | 616 |

|  | Nitrovin, 10 p.p.m. | Na₂SO₄ plus nitrovin | CTC plus nitrovin | CTC plus nitrovin plus Na₂SO₄ |
|---|---|---|---|---|
| None | 575 | 599 | 621 | 618 |
| 0.5% NaFB | 602 | 603 | 632 | 627 |
| 1.0% NaFB | 623 | 602 | 606 | 633 |

EXAMPLE 5

Following the procedure of Example 2, the efficacy of potassium formaldehyde bisulfite (KFB) as a growth promoter for poultry is determined and compared with sodium formaldehyde bisulfite used for this purpose. Treatments are: No additive (control), 0.5% sodium formaldehyde bisulfite by weight of feed and 0.5% potassium formaldehyde bisulfite. The data obtained show that both the sodium and potassium compositions are highly effective as growth promoters.

Four week weight gain (grams/bird)

Control (no additive) _____ 283.5
NaFB (0.5%) _____ 290.3
KFB (0.5%) _____ 290.1

Four week feed conversion (gram feed/gram gain)

Control (no additive) _____ 1.70
NaFB (0.5%) _____ 1.63
KFB (0.5%) _____ 1.68

EXAMPLE 6

To determine the growth promoting effects of sodium formaldehyde sulfoxylate and compare the same with sodium formaldehyde bisulfite poultry feeds are prepared using the above described basal diet with 0.8 or 1.6% by weight of one of the above named compositions. A portion of each feed is separated from the mass, pelleted with a conventional pelletizer and reground. The test procedure employed for establishing growth promoting effects of the test compounds is that of Example 2. The data reported below are an average of two tests with three replicates for each treatment.

FOUR WEEK WEIGHT (GRAMS/BIRD)

| Dietary level, percent | Sodium formaldehyde sulfoxylate | | Sodium formaldehyde bisulfate | |
|---|---|---|---|---|
|  | Mash | Pellets | Mash | Pellets |
| 0 | 540 | 558 | 550 | 559 |
| 0.8 | 559 | 573 | 576 | 585 |
| 1.6 | 558 | 582 | 584 | 606 |

The above data demonstrates that both compositions are highly effective as growth promoters for poultry when administered in both mash and pelleted feeds at 0.8 or 1.6% concentrations.

EXAMPLE 7

To determine the growth promoting effects on farm animals of the compositions of the invention, sodium formaldehyde sulfoxylate is administered to weanling pigs of approximate equal size and weight, randomly divided into groups of five. Each pig is weighed and placed in an individual pen. Feed and water are supplied ad libitum. The basal ration used in these tests is the same for all pigs and is set forth below.

Treatments, assigned randomly to each group, are as follows:

A—Basal
B—Basal+0.5% sodium formaldehyde sulfoxylate
C—Basal+0.25% of a medicated premix supplying 100 gms./ton of chlortetracycline; 100 gms./ton of feed of sulfamethazine 50 gms./ton of feed of penicillin.
D—Basal+0.5% sodium formaldehyde sulfoxylate +0.25% of the said premix.

Individual body weights are obtained at two week intervals and the tests are terminated six weeks after initiation.

The results of these tests, reported below, clearly show an enhanced growth rate in the animals receiving sodium formaldehyde sulfoxylate alone and in combination with the other drugs used in said tests.

Composition of basal ration

| Ingredient: | Percent |
|---|---|
| Ground yellow corn | 78.2 |
| Soybean oil meal (50% protein) | 18.3 |
| Dicalcium phosphate | 1.8 |
| Ground limestone | 0.5 |
| Iodized salt | 0.5 |
| Trace minerals [1] | 0.1 |
| Vitamin mix [2] | 0.6 |
| Total | 100.0 |

[1] and [2] These ingredients are described above in connection with the poultry feed.

AVERAGE PIG WEIGHTS AND GAINS

| Treatment [1] | Average weights (kilograms) | | | | Six week gain (kg.) |
|---|---|---|---|---|---|
| | Start | Plus 2 weeks | Plus 4 weeks | Plus 6 weeks | |
| Control | 9.74 | 15.92 | 23.04 | 33.06 | 23.32 |
| SFS | 9.78 | 16.64 | 25.20 | 34.94 | 25.16 |
| ASP | 9.78 | 17.98 | 27.44 | 38.42 | 28.64 |
| SFS plus ASP | 9.78 | 18.08 | 28.04 | 39.54 | 29.76 |

[1] SFS=Sodium formaldehyde sulfoxylate, 0.5% of diet.
ASP=Aureo S.P 250® medicated premix, 0.25% of diet. It consists of 100 g./ton of chlortetracycline, 100 g./ton of sulfamethanzine, 50 g./ton of penicillin.

EXAMPLE 8

Related compounds are tested for growth promoting activity by the procedure of Example 1 and found to be ineffective for this purpose. Data obtained with paraformaldehyde, dimethylsulfoxide, formaldehyde, hydrazine sulfate, the sodium salt of 4-formyl-1-phenol-2-sulfonic acid and 1,1-diethylguanidine sulfate versus individual controls are given below.

| Compound | Average wt. per bird in grams, days after start | | | | |
|---|---|---|---|---|---|
| | 0 | 7 | 14 | 21 | 28 |
| None | 39.9 | 88.6 | 178.9 | 308.8 | 509 |
| 200 p.p.m. CTC | 40 | 90.9 | 186.9 | 328.9 | 522.7 |
| 10 p.p.m. nitrovin | 39.8 | 92.9 | 190.3 | 338.6 | 543.4 |
| 0.2% paraformaldehyde | 40.1 | 91.1 | 182.3 | 309.8 | 493.9 |
| None | 40.7 | 92.6 | 198.9 | 302.2 | |
| 25 p.p.m. (CH$_3$)$_2$SO | 40.7 | 88.7 | 188.7 | 294.8 | |
| 200 p.p.m. (CH$_3$)$_2$SO | 40.7 | 87.9 | 191.6 | 290.6 | |
| None | 40.9 | | 187.6 | | 513.6 |
| 0.25% of 37% formaldehyde solution | 40.7 | | 194.8 | | 516.9 |
| None | 40.7 | | 191.4 | [1] 300.3 | |
| 100 p.p.m. hydrazine sulfate | 40.7 | | 176.7 | 285.8 | |
| None | 40.7 | | 207.6 | 343.1 | |
| 100 p.p.m. sodium salt of 4-formyl-1-phenol-2-sulfonic acid | 40.8 | | 187.5 | 310.3 | |
| None | 40.7 | | 181.7 | 292.9 | |
| 100 p.p.m. 1,1-diethylguanidine sulfate | 40.8 | | 173.7 | 282.3 | |

[1] 20 days.

EXAMPLE 9

Substantial growth enhancement of chicks receiving a balanced diet containing 1% by weight of sodium formaldehyde bisulfite and 200 p.p.m. of tetracycline (TC), 200 p.p.m. oxytetracycline (OTC) or 200 p.p.m. demethylchlortetracycline (DMCTC) with and without 10 p.p.m. of Payzone® nitrovin (bis(5-nitrofurfurylidene)-acetoneguanylhydrazone) is demonstrated by the following tests.

Three groups of sexed chicks, 6 males, 6 females per group, are used for each treatment. All groups are weighed initially and at 2 and 4 weeks after treatment is begun. The average weights per group are recorded and provided below in grams per group. Average weight of chick groups at the start of the tests is about 42 grams.

| Treatment | 2 wks. weight in grams (avg.)/bird | | | |
|---|---|---|---|---|
| | None | 1% NaFB | Nitrovin, 10 p.p.m. | 10 p.p.m. nitrovin plus 1% NaFB |
| Control | 192.5 | 206.8 | 200.5 | 221.5 |
| 200 TC | 200.8 | 226.8 | 213.5 | 230.7 |
| 200 OTC | 206.9 | 211.3 | 213.2 | 222.3 |
| 200 DMCTC | 204.8 | 214.9 | 218.1 | 229.5 |
| | 4 wks. weight in grams (avg.) | | | |
| Control | 564.2 | 600.7 | 590.3 | 625.3 |
| 200 TC | 575.7 | 631.8 | 616.2 | 637.8 |
| 200 OTC | 594.8 | 595.2 | 610.0 | 609.0 |
| 200 DMCTC | 594.9 | 607.4 | 607.2 | 631.6 |

EXAMPLE 10

The efficacy of the compounds of the invention for enhancing the growth rate of poultry is further demonstrated by the following tests wherein sodium formaldehyde bisulfite is administered to chicks in a balanced feed as described above, at the 1, 2, 4 and 8 percent levels.

Day old chicks (5 males and 5 females per group), are used and medicated feed and water are administered ad libitum for 14 days. Four groups of chicks are used as controls and three groups are employed for each test treatment. Average initial weight of the chicks in each group is about 42 grams. Fourteen days after treatment is begun each group is weighed and the results obtained are provided below. These data show substantial growth enhancement of the birds at all levels of treatment, with outstanding improvement at the 1, 2 and 4 percent levels.

| Treatment | 2 weeks weight (grams) | Percent increase over controls |
|---|---|---|
| Control | 155.5 | |
| 1% NaFB [1] | 182.6 | 17.4 |
| 2% NaFB | 192.8 | 24.0 |
| 4% NaFB | 179.8 | 15.6 |
| 8% | 160.5 | 3.2 |

[1] NaFB—Sodium formaldehyde bisulfite.

EXAMPLE 11

This is an example showing the improved growth response in turkeys obtained by administration of 0.25%, 0.5% and 1.0% by weight of feed of sodium formaldehyde bisulfite (NaFB) alone and in combination with Aureomycin® chlortetracycline and Payzone® nitrovin.

In the following tests, triplicate pens of turkey poults (5 males and 5 females/pen) were weighed at the start of the test and upon termination at four weeks. Feed and water were supplied ad libitum. The basal diet employed in these tests was as follows:

| Basal diet: | Percent |
|---|---|
| Ground yellow corn | 40.90 |
| Soybean oil meal, 50% protein | 43.30 |
| Menhaden fish meal | 7.50 |
| Corn and soybean oil | 3.00 |
| Dicalcium phosphate | 2.00 |
| Ground limestone | 1.30 |
| Brewers dred yeast | 1.25 |
| Iodized salt | 0.25 |
| Vitamin mineral premix | 0.50 |

10 lbs. vitamin mineral premix contains:

| | Gms. |
|---|---|
| MnSO$_4$, feed grade | 227 |
| Vitamin A 30,000 i.u./gm. | 334 |
| Vitamin D$_3$ 30,000 i.c.u./gm. | 64 |
| 25% choline chloride | 2270 |
| Vit. B$_{12}$ supplement 20 mg./lb. | 227 |
| Niacinamide | 45.4 |
| Tocopherol succinate | 5 |
| Folic acid supplement (10%) | 8.2 |
| Vitamin K | 1 |
| Riboflavin | 5 |
| Pantothenic acid | 10 |
| Niacin | 22.5 |
| Choline | 25 |
| Corn up to 10 lbs. | |

The average weight per bird in all treatments at the start of the test was 54 gms. On completion of the test, all birds were weighed and the average sex weight per bird at four weeks is reported below along with the percent enhancement over controls.

| Treatment | 4 week data | |
|---|---|---|
| | Av. sexed wt./turkey, gms. | Percent enhancement over controls |
| None | 575 | |
| 0.25% NaFB | 637 | 10.8 |
| 0.50% NaFB | 631 | 0.7 |
| 1.000% NaFB | 652 | 13.4 |
| 10 p.p.m. nitrovin | 623 | 8.3 |
| 200 p.p.m. CTC | 638 | 11.0 |
| 200 p.p.m. CTC plus 10 p.p.m. nitrovin | 649 | 12.9 |
| 200 p.p.m. CTC plus 10 p.p.m. nitrovin plus 0.25% NaFB | 663 | 15.3 |
| 200 p.p.m. CTC plus 10 p.p.m. nitrovin plus 0.50% NaFB | 663 | 15.3 |
| 200 p.p.m. CTC plus 10 p.p.m. nitrovin plus 1.0% NaFB | 674 | 17.2 |
| 200 p.p.m. CTC plus 10 p.p.m. nitrovin plus 1.0% NaFB | 699 | 21.6 |

From the data it can be see that NaFB was highly effective for enhancing the growth rate of turkeys when administered alone and/or in combination with CTC and/or nitrovin.

What is claimed is:

1. A method for accelerating the growth rate of poultry and animals comprising administering to said poultry and animals a growth accelerating amount of a compound selected from the group consisting of alkali metal formaldehyde sulfoxylates, alkali metal formaldehyde bisulfites and mixtures thereof.

2. Method as defined in claim 1 wherein the compound is sodium formaldehyde sulfoxylate.

3. Method as defined in claim 1 wherein the compound is potassium formaldehyde sulfoxylate.

4. Method as defined in claim 1 wherein the compound is sodium formaldehyde bisulfite.

5. Method as defined in claim 1 wherein the compound is potassium formaldehyde bisulfite.

6. Method as defined in claim 1 wherein a growth accelerating amount of a substance selected from the group consisting of tetracycline antibiotics, tylosin, zinc bacitracin, erythromycin, bis(5-nitrofurfurylidene)-acetoneguanylhydrazone, sulfamethazine, penicillin, the pharmaceutically acceptable salts of said substances, and mixtures thereof, is additionally administered to said poultry and animals.

7. A method for accelerating the growth rate of poultry and animals comprising administering to said poultry and animals a growth accelerating ingestible composition comprising a non-toxic ingestible diluent and a growth ac-accelerating amount of a substance selected from the group consisting of alkali metal formaldehyde sulfoxylates and alkali metal formaldehyde bisulfites.

8. A method according to claim 7 wherein the growth accelerating composition additionally contains a growth accelerating amount of a substance selected from the group consisting of tetracycline antibiotics, tylosin, zinc bacitracin, erythromycin, bis(5 - nitrofurfurylidene)-acetoneguanylhydrazone, sulfamethazine, penicillin, the pharmaceutically acceptable salts of said substances, and mixtures thereof.

9. A method for accelerating the growth rate of poultry and animals comprising administering to said poultry and animals a nutritionally balanced poultry or animal feed containing a growth accelerating amount of a compound selected from the group consisting of alkali metal formaldehyde sulfoxylates and alkali metal formaldehyde bisulfites.

10. Method as defined in claim 9 wherein aditionally a growth acelerating amount of a substance selected from the group consisting of tetracycline antibiotics, tylosin, zinc bacitracin, erythromycin, bis(5-nitrofurfurylidene)-acetoneguanylhydrazone, sulfamethazine, penicillin, the pharmaceutically acceptable salts of said susbtances, and mixtures thereof, is administered to said poultry and animals.

11. A growth accelerating poultry and animal feed concentrate comprising from about 15% to 60% by weight of a nutritionally balanced poultry or animal feed and from about 40% to 85% by weight of a compound selected from the group consisting of alkali metal formaldehyde sulfoxylates and alkali metal formaldehyde bisulfites.

References Cited

UNITED STATES PATENTS

| 2,046,507 | 7/1936 | Freedman | 424—303 |
| 2,753,266 | 7/1956 | Ott | 99—2 |
| 2,903,356 | 9/1959 | Lampen et al. | 99—2 |
| 3,062,718 | 11/1962 | Spiegel | 424—271 |
| 3,235,453 | 2/1966 | Vierling | 424—247 |

OTHER REFERENCES

Logemann et al., Arzneimittel Forschung, 1955, pp. 213–214.

Chemical Abstracts I, vol. 55, p. 20189c.

Chemical Abstracts II, vol. 53, p. 20332g.

Derwent Farmdoc #11767 Abstracting Japanese Patent 4479/64, published 4/14/64.

Lassiter et al., J. of Dairy Science 42, pp. 1712–1717 (1959).

ALBERT T. MEYERS, Primary Examiner

V. D. TURNER, Assistant Examiner

U.S. Cl. X.R.

424—120, 177, 181, 227, 228, 271, 285, 315; 99—2